United States Patent
Tachikawa

(10) Patent No.: US 6,270,064 B1
(45) Date of Patent: Aug. 7, 2001

(54) HYDRAULIC SHOCK ABSORBER

(75) Inventor: Junya Tachikawa, Yokohama (JP)

(73) Assignee: Tokico Ltd, Kanagawa-ken (JP)

( * ) Notice: Subject to any disclaimer, the term of this patent is extended or adjusted under 35 U.S.C. 154(b) by 0 days.

(21) Appl. No.: 09/343,682

(22) Filed: Jun. 30, 1999

(30) Foreign Application Priority Data

Jun. 30, 1998 (JP) .................................................. 10-199574

(51) Int. Cl.$^7$ ...................................................... F16F 9/14
(52) U.S. Cl. .................................... 267/64.15; 267/64.23; 188/322.19
(58) Field of Search .................... 188/322.19, 322.13, 188/322.15, 322.16, 269, 314, 315, 289; 267/64.15, 64.19, 64.23, 64.27, 64.26

(56) References Cited

U.S. PATENT DOCUMENTS

| | | | |
|---|---|---|---|
| 3,790,146 | * | 2/1974 | Hoffmann et al. ................. 267/64.19 |
| 4,226,408 | * | 10/1980 | Tomita et al. .................... 188/315 X |
| 5,107,970 | * | 4/1992 | Driessen et al. ................. 188/322.16 |
| 5,115,892 | * | 5/1992 | Yamaoka et al. ............ 188/322.15 X |
| 5,878,852 | * | 3/1999 | Masamura et al. .................. 188/289 |
| 6,105,945 | * | 8/2000 | Takeuchi et al. ........... 188/322.16 X |

FOREIGN PATENT DOCUMENTS 9-144801   6/1997   (JP) .

* cited by examiner

*Primary Examiner*—Robert J. Oberleitner
*Assistant Examiner*—Melanie Torres
(74) *Attorney, Agent, or Firm*—Wenderoth, Lind & Ponack L.L.P.

(57) ABSTRACT

In a self-pumping type hydraulic shock absorber, an outer cylinder is provided to cover an outer circumferential surface of a cylinder. The outer cylinder is formed to have a small-diameter portion, a mid-diameter portion and a large-diameter portion. A reservoir is formed between the large-diameter portion and the cylinder to communicate with upper and lower cylinder chambers. A cylinder member is fitted onto the mid-diameter portion and the large-diameter portion of the outer cylinder to form an oil tank between the cylinder member and the outer cylinder. A suspension spring (a coil spring) is provided between a spring seat attached to the small-diameter portion of the outer cylinder and a spring seat connected to a piston rod. Thus, the reservoir and the oil tank are provided inside the coil spring, so that each of the reservoir and the oil tank can be made to have a sufficiently large volume and the hydraulic shock absorber requires less space for mounting.

9 Claims, 3 Drawing Sheets

HYDRAULIC SHOCK ABSORBER

BACKGROUND OF THE INVENTION

The present invention relates to a hydraulic shock absorber to be mounted on a suspension apparatus for a vehicle, such as an automobile.

Generally, in a suspension apparatus for a vehicle such as an automobile, a hydraulic shock absorber is provided between a sprung mass and an unsprung mass, to thereby damp vibrations of the suspension apparatus to provide good ride quality and steering stability.

In a vehicle having a relatively large loading capacity, such as a van and a station wagon, a change in vehicle height occurs due to a change in the load on the vehicle, for example, a change in the number of passengers or the number of articles carried. Such a change in vehicle height leads to a lowering of ride quality and steering stability. Therefore, it has been desired to develop a suspension apparatus having an ability to automatically maintain a predetermined vehicle height regardless of the load carried by the vehicle.

For obtaining a suspension apparatus which automatically maintains a predetermined vehicle height, for example, it has been proposed to use a so-called self-pumping type hydraulic shock absorber. Such a self-pumping type hydraulic shock absorber is disclosed in Unexamined Japanese Patent Application Public Disclosure Kokai No. 60-261713. This hydraulic shock absorber comprises: an oil tank and a reservoir each having a gas and a hydraulic fluid sealably contained therein under appropriate pressure; pumping means for supplying the hydraulic fluid in the oil tank into a cylinder in accordance with extension strokes and compression strokes of a piston rod; and return means for returning the hydraulic fluid in the pumping means and the cylinder to the oil tank depending on the position of the piston rod during the strokes. In this hydraulic shock absorber, the pumping means and the return means are operated by utilizing vibrations of the suspension apparatus during the running of the vehicle, thereby controlling the pressure in the cylinder appropriately and adjusting the degree of extension of the piston rod to a predetermined level, thus automatically maintaining a predetermined vehicle height.

In the self-pumping type hydraulic shock absorber of Kokai No. 60-261713, a double-cylinder structure is employed by providing an outer cylinder to cover an outer circumferential surface of the above-mentioned cylinder, and the oil tank and the reservoir are provided between these two cylinders. In this case, the volume of each of the oil tank and the reservoir is inevitably small and, therefore, when the load carried by the vehicle is large, the rate of increase in repulsive force of the gas during the strokes of the piston rod is large, leading to a lowering of ride quality.

For suppressing a change in repulsive force of the gas during the strokes of the piston rod to provide good ride quality, it has been desired to employ an oil tank and a reservoir each having a sufficiently large volume. An oil tank and a reservoir each having a large volume can be employed by providing the oil tank separately from the main body of the hydraulic shock absorber. However, for example, in a suspension apparatus for an automobile, the space for mounting of the hydraulic shock absorber is very limited, making it difficult to secure the space that is necessary for accomodating the separate oil tank.

The present assignee proposed, in Japanese Patent Application No. 7-331050 [corresponding to Unexamined Japanese Patent Application Public Disclosure (Kokai) No. 9-144801], a self-pumping type hydraulic shock absorber in which an annular oil tank is provided around an outer cylinder below a spring sheet which is attached to the outer cylinder to receive a suspension spring.

However, in the hydraulic shock absorber in which the oil tank is provided below the spring sheet, the length of the suspension spring is limited for securing the space for mounting of the oil tank. Further, the outer diameter of the hydraulic shock absorber around its portion to be connected to the suspension apparatus is large, so that the shape of the suspension apparatus at its portion to be connected to the hydraulic shock absorber is limited.

SUMMARY OF THE INVENTION

In view of the above situation, the present invention has been developed. It is an object of the present invention to provide a hydraulic shock absorber which enables the chambers communicated with cylinder chambers, such as a reservoir and an oil tank, to have sufficiently large volumes and which requires less space for mounting.

In the present invention, there is provided a hydraulic shock absorber comprising: a cylinder having a hydraulic fluid sealably contained therein; an outer cylinder provided so as to cover an outer circumferential surface of the cylinder; a piston slidably provided within the cylinder to divide the inside of the cylinder into two cylinder chambers; a piston rod having one end connected to the piston and the other end extending to the outside of the cylinder; and a damping force generating mechanism for generating a damping force by controlling flow of the hydraulic fluid which is generated due to a sliding motion of the piston within the cylinder. The hydraulic shock absorber is adapted to be provided so as to extend through a coil spring when used. The outer cylinder has an expanded portion formed at a portion thereof covered by the coil spring, and the expanded portion expands outwardly toward the coil spring. A first chamber is provided within the expanded portion of the outer cylinder so as to communicate with the cylinder chambers.

By this arrangement, the first cylinder chamber communicated with the cylinder chambers can be provided between the cylinder and the coil spring.

In the above-mentioned hydraulic shock absorber, a cylinder member in a generally cylindrical form may be attached to an outer circumferential surface of the outer cylinder extending through the coil spring so that the cylinder member extends from the expanded portion to a portion of the outer cylinder other than the expanded portion and a second chamber may be provided between the cylinder member and the outer cylinder so as to communicate with the cylinder chambers.

By this arrangement, the second chamber which is communicated with the cylinder chambers can be provided between the cylinder and the coil spring.

The foregoing and other objects, features and advantages of the present invention will be apparent from the following detailed description and appended claims taken in connection with the accompanying drawings.

DETAILED DESCRIPTION OF THE INVENTION

An embodiment of the present invention is described below, with reference to the accompanying drawings.

Figure 1A:
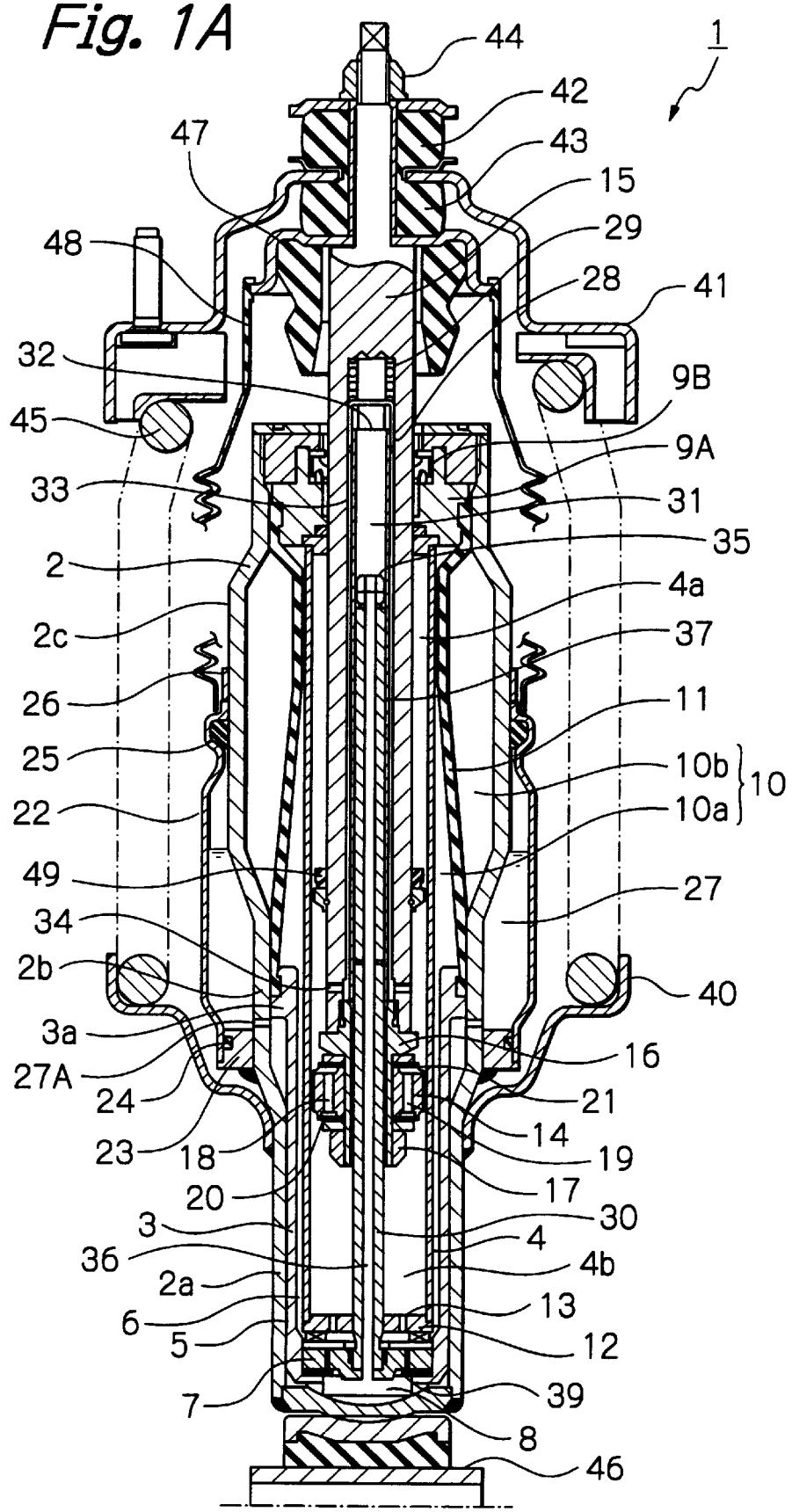
FIG. 1A shows a vertical cross-section of a hydraulic shock absorber according to an embodiment of the present invention.

FIG. 1A shows a hydraulic shock absorber 1 according to an embodiment of the present invention. The hydraulic shock absorber 1 has a multiple-cylinder structure in which a generally cylindrical partition wall 3 and a cylinder 4 are provided within an outer cylinder 2. The outer cylinder 2 has a generally cylindrical form having one end closed, but is expanded so that the diameter of the outer cylinder 2 increases from the bottom of the outer cylinder 2 in a stepwise manner to form a small-diameter portion 2a, a mid-diameter portion 2b and a large-diameter portion (an expanded portion) 2c. The partition wall 3 extends from the small-diameter portion 2a to an area in the vicinity of the center of the mid-diameter portion 2b of the outer cylinder 2. An outer flange 3a, formed at an upper end portion of the partition wall 3, is fitted into the mid-diameter portion 2b so that an annular hydraulic fluid passage 5 is formed between the outer cylinder 2 and the partition wall 3 and an annular hydraulic fluid passage 6 is formed between the partition wall 3 and the cylinder 4. A separation member 7 is fitted into a lower end portion of the partition wall 3 so that an oil chamber 8 is formed between the separation member 7 and the bottom of the outer cylinder 2 to communicate with the annular hydraulic fluid passage 5. A guide seal 9A and an oil seal 9B are provided on an upper end of the cylinder 4 while in contact with the outer cylinder 2 so that an annular reservoir (a first chamber) 10 is formed between the cylinder 4, and the mid-diameter portion 2b and the large-diameter portion 2c of the outer cylinder 2 to communicate with the annular hydraulic fluid passage 6.

In the reservoir 10, a generally cylindrical bladder (a flexible membrane) 11 is provided to divide the inside of the reservoir 10 into an oil chamber 10a communicated with the annular hydraulic fluid passage 6 and a gas chamber 10b having a high-pressure (about 30 kgf/cm$^2$) gas sealably contained therein. The bladder 11 is made of a flexible material, such as rubber, and has its opposite ends clamped against the outer cylinder 2 by the outer flange 3a of the partition wall 3 and the guide seal 9A.

A base member 12 is fitted into a lower end portion of the cylinder 4. The inside of the cylinder 4 is communicated, through an orifice passage 13 of the base member 12, with the annular hydraulic fluid passage 6 which is communicated with the oil chamber 10a.

A piston 14 is slidably provided within the cylinder 4 to divide the inside of the cylinder 4 into two chambers, namely, an upper cylinder chamber 4a and a lower cylinder chamber 4b. The piston 14 is connected through a piston bolt 16 to one end of a piston rod 15 having a hollow structure, by means of a nut 17. The other end of the piston rod 15 passes through the guide seal 9A and the oil seal 9B on the upper end of the cylinder 4, so as to extend to the outside of the cylinder 4. A hydraulic fluid is sealably contained in the cylinder 4.

The piston 14 includes hydraulic fluid passages 18 and 19 to provide communication between the upper cylinder chamber 4a and the lower cylinder chamber 4b, and also includes damping force generating mechanisms 20 and 21 comprising orifices and disk valves for generating a damping force by controlling flow of the hydraulic fluid through the hydraulic fluid passages 18 and 19.

A cylinder member 22 in a generally cylindrical form is fitted onto the mid-diameter portion 2b and the large-diameter portion 2c of the outer cylinder 2. Illustratively stated, the cylinder member 22 is fixed by means of a retainer ring 26 press-fitted onto the large-diameter portion 2c, such that a lower end portion of the cylinder member 22 is fitted onto an annular member 23 fixed to the mid-diameter portion 2b, with an O-ring 24 being provided therebetween, and the other end of the cylinder member 22 is fitted onto the large-diameter portion 2c with an O-ring 25 being provided therebetween. Thus, an annular oil tank (a second chamber) 27 is formed between the cylinder member 22, and the mid-diameter portion 2b and the large-diameter portion 2c. The oil tank 27 is communicated with the annular hydraulic fluid passage 5 through a hydraulic fluid passage 27A formed in a side wall of the mid-diameter portion 2b. A low-pressure (about 3 to 5 kgf/cm$^2$) gas and the hydraulic fluid are sealably contained in the oil tank 27.

A pump tube 28 is contained in the piston rod 15 and is fixed by a spring 29. A tubular pump rod 30 extends within the cylinder 4 along the axis thereof. A proximal end portion of the pump rod 30 is inserted through the base member 12 and is connected to the separation member 7. A distal end portion of the pump rod 30 is slidably fitted into the pump tube 28 to form a pump chamber 31 within the pump tube 28.

The pump chamber 31 is communicated with the upper cylinder chamber 4a through a check valve 32 provided at a distal end portion of the pump tube 28, a hydraulic fluid passage 33 formed between the pump tube 28 and the piston rod 15 and a hydraulic fluid passage 34 formed in a side wall of the piston rod 15. The check valve 32 allows flow of the hydraulic fluid only in the direction from the pump chamber 31 toward the hydraulic fluid passage 33. The pump chamber 31 is also communicated with the oil tank 27 through a check valve 35 formed at the distal end portion of the pump rod 30, a hydraulic fluid passage 36 in the pump rod 30, the oil chamber 8, the annular hydraulic fluid passage 5 and the hydraulic fluid passage 27A. The check valve 35 allows flow of the hydraulic fluid only in the direction from the hydraulic fluid passage 36 toward the pump chamber 31.

Figure 1B:
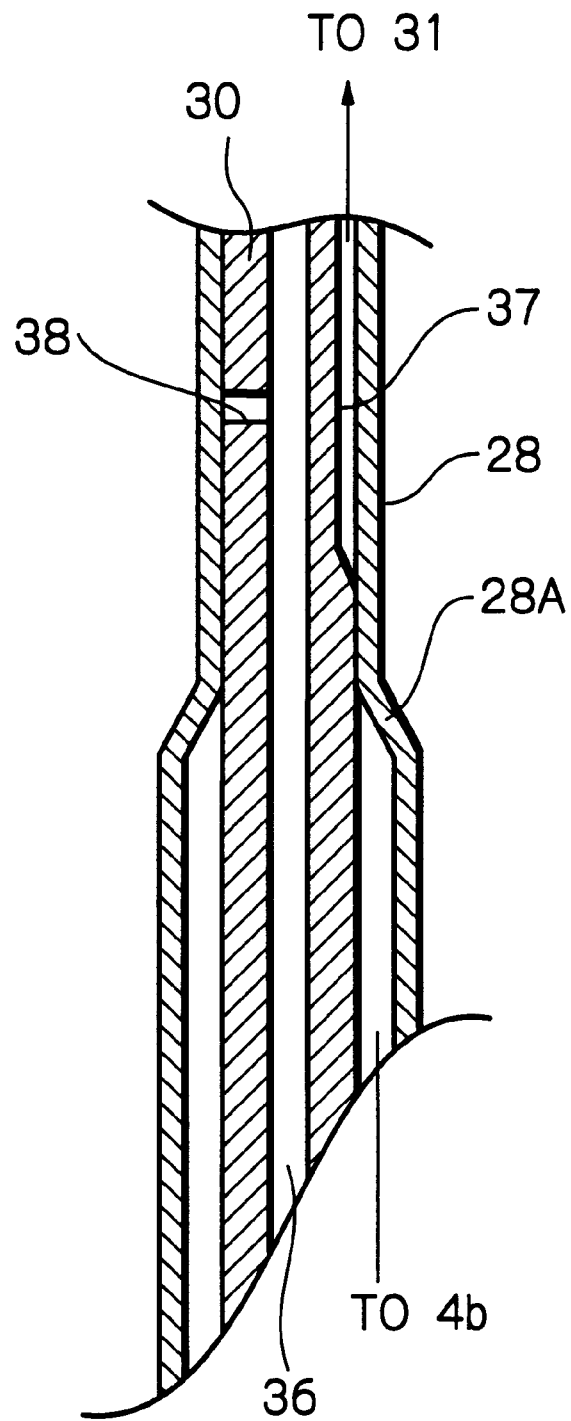
FIG. 1B is an enlarged view of a part of FIG. 1A.

FIG. 1B is an enlarged view of a part of the hydraulic shock absorber of FIG. 1A. As shown in FIG. 1B, an outer surface of a side wall of the pump rod 30 is recessed to form a groove 37 axially extending from the top of the pump rod 30. Further, an orifice passage 38 is formed in the side wall of the pump rod 30. A lower portion of the pump tube 28 is expanded to form a stepped portion 28A. An annular space between the pump tube 28 and the pump rod 30 below the stepped portion 28A is communicated with the lower cylinder chamber 4b.

When the degree of extension of the piston rod 15 has reached a predetermined range (that is, when a lower end of the groove 37 has passed the stepped portion 28A of the pump tube 28), the pump chamber 31 is communicated with the cylinder chambers and pumping is stopped, to thereby maintain a vehicle height at a predetermined level.

When the degree of extension of the piston rod 15 exceeds the predetermined range (that is, when the orifice passage 38 has passed the stepped portion 28A of the pump tube 28), the hydraulic fluid passage 36 is directly communicated with the cylinder chambers, to thereby lower the vehicle height. Thus, the vehicle height is returned to the predetermined level.

Referring back to FIG. 1A, a relief valve 39 is provided in the separation member 7. When the pressure of the hydraulic fluid on a side of the reservoir 10, that is, the pressure of the hydraulic fluid in the upper and lower cylinder chambers 4a and 4b reaches a predetermined level, the relief valve 39 opens to release the hydraulic fluid through the oil chamber 8 toward the oil tank 27.

An annular spring seat 40 is attached to an outer circumferential surface of the small-diameter portion 2a of the outer cylinder 2. A spring seat 41 is provided between bushes 42 and 43 and is connected to a distal end portion of the piston rod 15 by means of a nut 44. A suspension spring (a coil spring) 45 is provided between the spring seats 40 and 41 so that the mid-diameter portion 2b and the large-diameter portion 2c of the outer cylinder 2 and the cylinder member 22 extend through the suspension spring 45.

The hydraulic shock absorber 1 is mounted, such that a mounting portion 46 fixed to the outer cylinder 2 is connected to a suspension apparatus (not shown) on the wheel side and the spring seat 41 is connected to the suspension apparatus on the vehicle body side. In FIG. 1A, reference numerals 47, 48 and 49 denote a bump rubber for the compression strokes, a dust cover and a bump rubber for the extension strokes, respectively.

Hereinbelow, an operation of the hydraulic shock absorber arranged as mentioned above is explained.

First, explanation is made on the generation of a damping force by the hydraulic shock absorber 1. When the piston 14 moves during the extension and compression strokes of the piston rod 15, the hydraulic fluid flows through the hydraulic fluid passages 18 and 19 between the upper cylinder chamber 4a and the lower cylinder chamber 4b, and a damping force is generated by means of the damping force generating mechanisms 20 and 21. During the extension and compression strokes of the piston rod 15, voluminal changes in the upper and lower cylinder chambers 4a and 4b occur depending on the volume of the portion of the piston rod 15 which enters or escapes from the piston rod 15. Such voluminal changes are compensated for by compression and expansion of the gas in the gas chamber 10b of the reservoir 10.

Next, explanation is made on automatic vehicle height adjustment by the hydraulic shock absorber 1. Normally, in an empty vehicle, the degree of extension of the piston rod 15 is within the predetermined range. In this state, the pump chamber 31 is communicated with the upper and lower cylinder chambers 4a and 4b through the groove 37 of the pump rod 30. Therefore, pumping is not effected during the strokes of the piston rod 15 and the vehicle height is maintained within a predetermined range.

When the vehicle height lowers due to, for example, an increase in the load carried by the vehicle and the degree of extension of the piston rod 15 falls below the predetermined range, the upper and lower cylinder chambers 4a and 4b are sealed off from the groove 37. In this state, as explained below, pumping is effected by utilizing vibrations of the suspension apparatus during the running of the vehicle. During the extension stroke of the piston rod 15, the pump rod 30 lowers relative to the piston rod 15 to thereby reduce the pressure in the pump chamber 31. Consequently, the check valve 35 opens, so that the hydraulic fluid in the oil chamber 27 flows into the pump chamber 31 through the hydraulic fluid passage 27A, the annular hydraulic fluid passage 5, the oil chamber 8 and the hydraulic fluid passage 36. During the compression stroke of the piston rod 15, the pump rod 30 advances to thereby pressurize the hydraulic fluid in the pump chamber 31. Consequently, the check valve 32 opens, so that the hydraulic fluid in the pump chamber 31 flows through the hydraulic fluid passages 33 and 34 into the upper and lower cylinder chambers 4a and 4b, to thereby move the piston rod 15 upward while pressurizing the gas in the gas chamber 10b of the reservoir 10. Pumping is repeated in the above-mentioned manner, to thereby increase the degree of extension of the piston rod 15 to increase the vehicle height. When the vehicle height reaches the predetermined range, the upper and lower cylinder chambers 4a and 4b are communicated with the pump chamber 31 through the groove 37, to thereby stop pumping.

When the vehicle height increases due to, for example, a decrease in the load carried by the vehicle and the degree of extension of the piston rod 15 exceeds the predetermined range, the upper and lower cylinder chambers 4a and 4b are communicated with the low-pressure oil tank 27 through the orifice passage 38 and the hydraulic fluid passage 36 in the pump rod 30, so that the hydraulic fluid in the upper and lower cylinder chambers 4a and 4b flows through the orifice passage 38, the hydraulic fluid passage 36, the oil chamber 8, the annular hydraulic fluid passage 5 and the hydraulic fluid passage 27A and returns to the oil tank 27. Consequently, the gas in the gas chamber 10b of the reservoir 10 expands and the piston rod 15 lowers, to thereby lower the vehicle height. When the vehicle height lowers and the degree of extension of the piston rod 15 is reduced to fall within the predetermined range, the orifice passage 38 is sealed off from the upper and lower cylinder chambers 4a and 4b, so that the flow of the hydraulic fluid returned from the upper and lower cylinder chambers 4a and 4b to the oil tank 27 is stopped, to thereby maintain the vehicle height within the predetermined range.

Thus, pumping and returning are repeated appropriately by utilizing vibrations of the suspension apparatus during the running of the vehicle, so that the degree of extension of the piston rod 15 is adjusted within the predetermined range, to thereby automatically maintain the vehicle height at a certain level regardless of the load carried by the vehicle. It should be noted that when the pressure of the hydraulic fluid in the cylinder 4 increases excessively due to pumping and a sudden lifting of the wheel due to the vehicle hitting a bump on the road surface while running, the relief valve 39 opens to release the hydraulic fluid in the cylinder 4 into the oil tank 27, to thereby reduce a load applied to connections and seals between members and absorb impact applied to the vehicle body.

Because the reservoir 10 and the oil tank 27 are provided inside the suspension spring 45, each of the reservoir 10 and the oil tank 27 can be made to have a sufficiently large volume and the suspension spring 45 can be made to have a sufficiently large length. Further, because the reservoir 10 and the oil tank 27 are provided inside the suspension spring 45, the hydraulic shock absorber has a small outer diameter around its portion that is to be connected to the suspension apparatus on the wheel side, so that the space required for mounting of the hydraulic shock absorber can be reduced.

Figure 2:
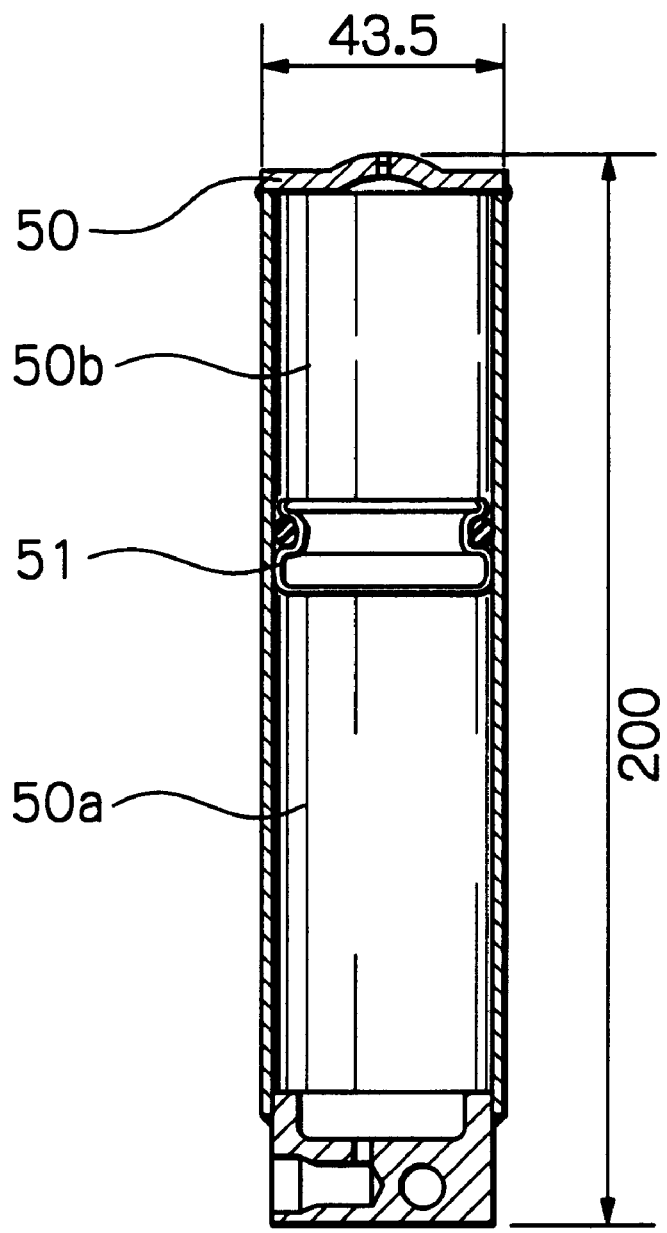
FIG. 2 shows a vertical cross-section of a separate type oil tank of a conventional self-pumping type hydraulic shock absorber.

Illustratively stated, for example, in FIG. 1A, when it is assumed that the diameter of the large-diameter portion 2c of the outer cylinder 2 is 85 mm and the diameter of the cylinder member 22 is 100 mm, the volume of the oil tank 27 is 180 ml. FIG. 2 shows, on the same scale as FIG. 1A, an oil tank 50 of a separate type used in a conventional hydraulic shock absorber, which has the same volume as the oil tank 27. In FIG. 2, reference numerals 51, 50a and 50b denote a free piston, an oil chamber and a gas chamber, respectively. As shown in FIG. 2, the oil tank 50 has a length of 200 mm and a diameter of 43.5 mm. Therefore, it is understood that the oil tank 50 requires a large space for mounting.

In the above-mentioned embodiment, the present invention is applied to a self-pumping type hydraulic shock absorber in which a reservoir and an oil tank are used as the first chamber and the second chamber in the present invention, respectively. However, the present invention is not limited to the above-mentioned embodiment and may be applied to other types of hydraulic shock absorbers by using other chambers communicated with the cylinder chambers as the first chamber and the second chamber.

As has been described above in detail, in the hydraulic shock absorber of the present invention, an outer cylinder provided so as to cover an outer circumferential surface of a cylinder has an expanded portion formed at a portion thereof covered by a coil spring. The expanded portion expands outwardly toward the coil spring and a first chamber is provided within the expanded portion of the outer cylinder to communicate with cylinder chambers. By this arrangement, the first chamber communicated with the cylinder chambers can be provided between the cylinder and the coil spring, so that the hydraulic shock absorber requires less space for mounting.

Further, in the above-mentioned hydraulic shock absorber, a cylinder member in a generally cylindrical form may be attached to an outer circumferential surface of the outer cylinder extending through the coil spring so that the cylinder member extends from the expanded portion to a portion of the outer cylinder other than the expanded portion, and a second chamber may be provided between the cylinder member and the outer cylinder to communicate with the cylinder chambers. By this arrangement, the second chamber communicated with the cylinder chambers can be provided between the cylinder and the coil spring, so that the hydraulic shock absorber requires less space for mounting.

What is claimed is:

1. A hydraulic shock absorber comprising:
    a cylinder having a hydraulic fluid sealably contained therein;
    an outer cylinder provided so as to cover an outer circumferential surface of said cylinder, said outer cylinder having opposite ends, with one of the opposite ends being closed;
    a spring seat secured to said outer cylinder;
    a piston slidably disposed within said cylinder so as to divide an interior of said cylinder into two cylinder chambers;
    a piston rod having a first end connected to said piston and a second end extending outside of said cylinder and outside of said outer cylinder through the other of the opposite ends of said outer cylinder; and
    a damping force generating mechanism for generating a damping force by controlling a flow of the hydraulic fluid that is generated due to a sliding motion of said piston within said cylinder,
    said hydraulic shock absorber being adapted to extend through a coil spring when in use while said spring seat supports an end of the coil spring,
    wherein said outer cylinder has an expanded portion that is located on an opposite side of said spring seat relative to the closed end of said outer cylinder so that the expanded portion is located in an area surrounded by the coil spring, and the expanded portion expands outwardly toward the coil spring,
    wherein a first chamber, communicating with the cylinder chambers, is defined between the expanded portion of said outer cylinder and said cylinder.

2. A hydraulic shock absorber according to claim 1, further comprising a cylinder member having a generally cylindrical form and being attached to an outer circumferential surface of said outer cylinder such that said cylinder member extends from the expanded portion to a portion of said outer cylinder other than the expanded portion, wherein a second chamber is defined between said cylinder member and said outer cylinder, and the second chamber communicates with the cylinder chambers.

3. A hydraulic shock absorber according to claim 1, wherein said first chamber is a reservoir that is divided into an oil chamber and a gas chamber.

4. A hydraulic shock absorber according to claim 3, further comprising an axially extending flexible membrane disposed in said first chamber so as to radially separate the oil chamber and the gas chamber.

5. A hydraulic shock absorber according to claim 2, further comprising a self-pumping mechanism disposed in said cylinder, wherein said first chamber is a reservoir and said second chamber is an oil tank from which hydraulic fluid can be supplied to the interior of said cylinder through said self-pumping mechanism.

6. A hydraulic shock absorber according to claim 1, wherein said outer cylinder includes a small diameter portion extending from the closed end, and an intermediate diameter portion extending between the small diameter portion and the expanded portion, and said spring seat is mounted on said small diameter portion of said outer cylinder.

7. A hydraulic shock absorber adapted to extend through a coil spring when in use, said hydraulic shock absorber comprising:
    a cylinder having a hydraulic fluid sealably contained therein;
    an outer cylinder provided so as to cover an outer circumferential surface of said cylinder, said outer cylinder having opposite ends, with one of the opposite ends being closed;
    a piston slidably disposed within said cylinder so as to divide an interior of said cylinder into two cylinder chambers;
    a piston rod having one end connected to said piston and another end extending outside of said cylinder and outside of said outer cylinder through the other of the opposite ends of said outer cylinder; and
    a damping force generating mechanism for generating a damping force by controlling a flow of the hydraulic fluid that is generated due to a sliding motion of said piston within said cylinder,
    wherein said outer cylinder has an expanded portion that is located on an opposite side of said spring seat relative to the closed end of said outer cylinder so that the expanded portion is located in an area surrounded by the coil spring, and the expanded portion expands radially outwardly toward the coil spring, and
    wherein a first chamber is defined between the expanded portion of said outer cylinder and said cylinder, and the first chamber communicates with the cylinder chambers; and
    a cylindrical member having a generally cylindrical form and being attached to an outer circumferential surface of said outer cylinder such that said cylindrical member extends from the expanded portion of said outer cylinder to a portion of said outer cylinder other than the expanded portion,
    wherein a second chamber is defined between said cylindrical member and said outer cylinder, and the second chamber communicates with the cylinder chambers.

8. A hydraulic shock absorbers according to claim 7, further comprising a self-pumping mechanism disposed in said cylinder, wherein said first chamber is a reservoir and said second chamber is an oil tank from which hydraulic fluid can be supplied to the interior of said cylinder through said self-pumping mechanism.

9. A hydraulic shock absorber adapted to extend through a coil spring when in use, said hydraulic shock absorber comprising:

a cylinder having a hydraulic fluid sealably contained therein;

an outer cylinder provided so as to cover an outer circumferential surface of said cylinder, said outer cylinder having opposite ends, with one of the opposite ends being closed;

a piston slidably provided within said cylinder so as to divide an interior of said cylinder into two cylinder chambers;

a piston rod having a first end connected to said piston and a second end extending outside of said cylinder and outside of said outer cylinder through the other of the opposite ends; and a damping force generating mechanism for generating a damping force by controlling a flow of the hydraulic fluid that is generated due to a sliding motion of said piston within said cylinder, wherein said outer cylinder has an expanded portion formed at a portion of said outer cylinder that is remote from said closed end of said outer cylinder so that the expanded portion is located in an area that would be covered by the coil spring, and the expanded portion expands outwardly toward the coil spring, wherein a first chamber is defined between the expanded portion of said outer cylinder and said cylinder, and the first chamber communicates with the cylinder chambers; and a flexible membrane disposed between said outer cylinder and said cylinder, said flexible member extending generally axially with respect to said cylinder so as to radially divide said first chamber into an oil chamber and a gas chamber.

\* \* \* \* \*